April 8, 1969    E. R. THORN ET AL    3,437,212
APPARATUS FOR SCUM REMOVAL
Filed Sept. 19, 1967    Sheet 1 of 5

INVENTOR.
EWALD REINHARD THORN, WILHELM WEBER,
ERNST SIEGFRIED LEMBERG, JOSEF BLANCHE.
BY John S. Munday
Agent

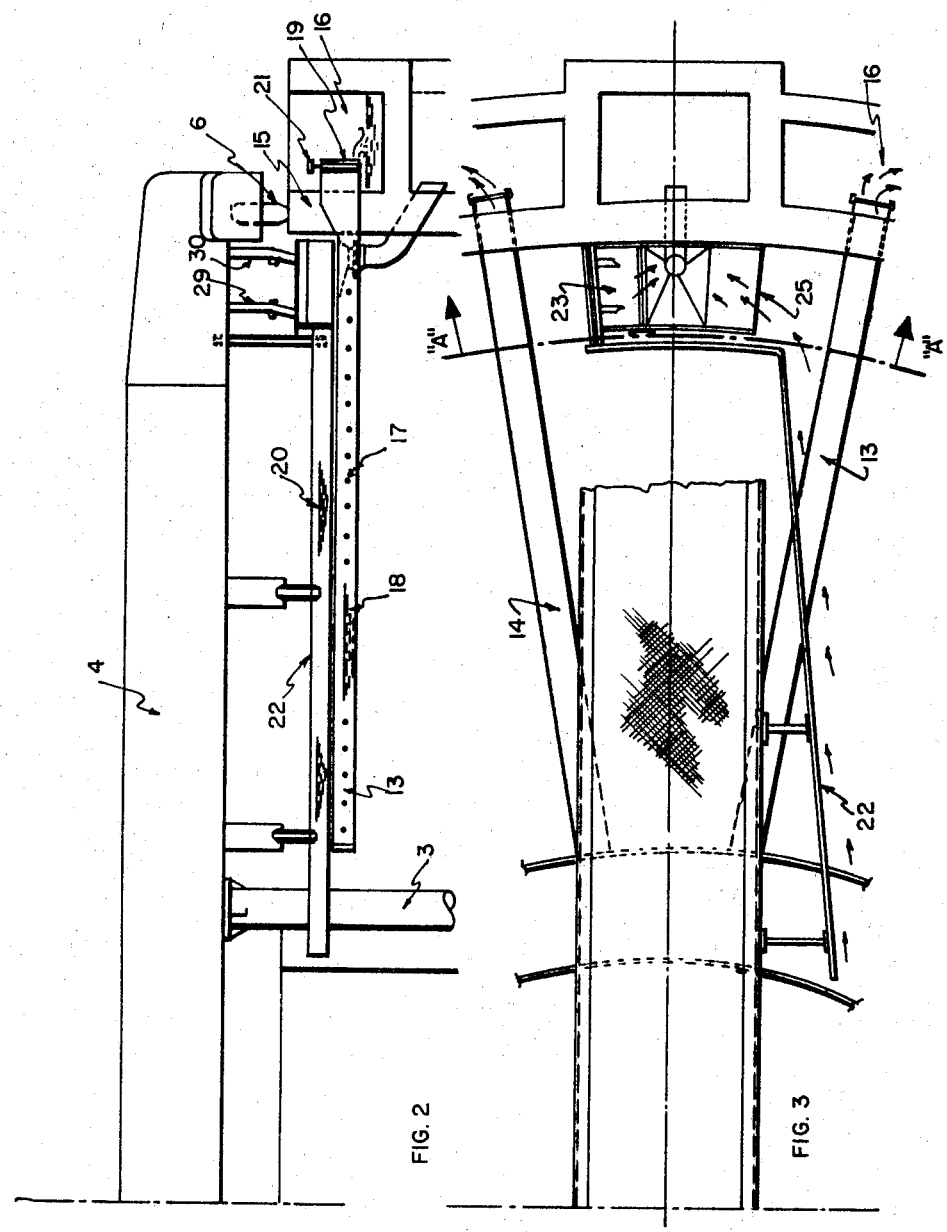

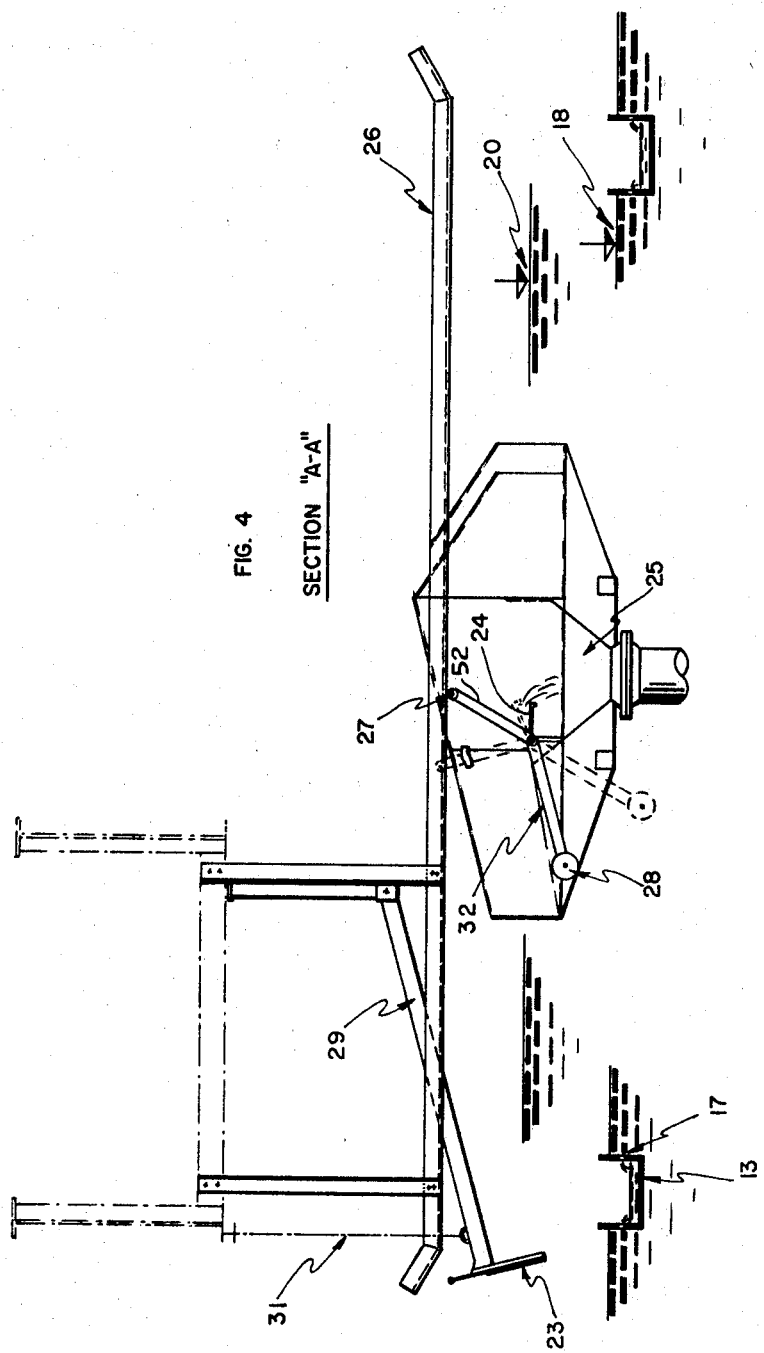

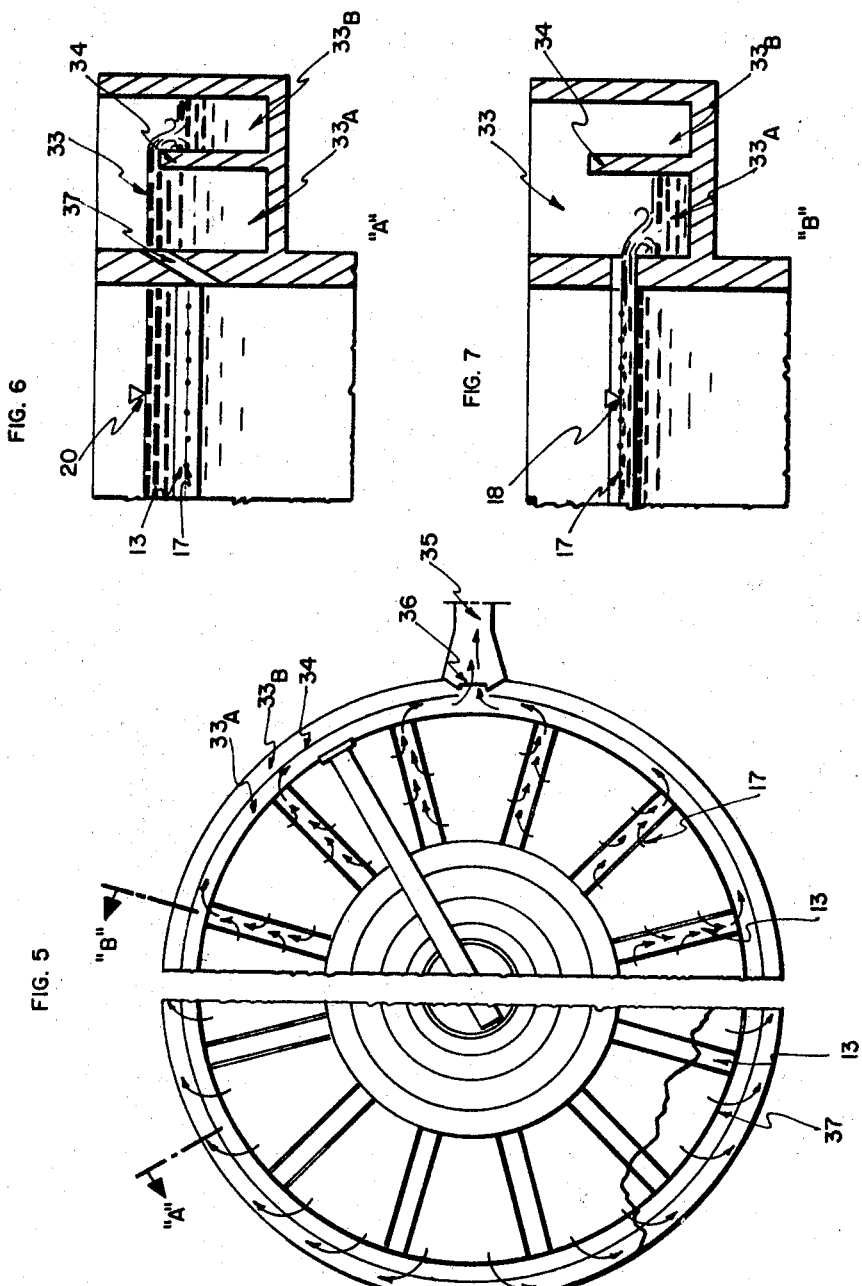

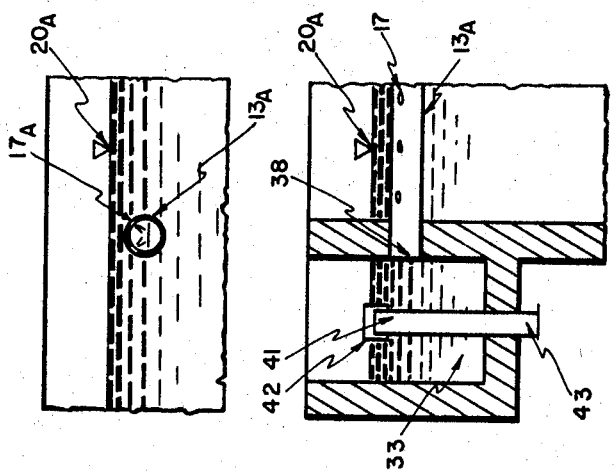
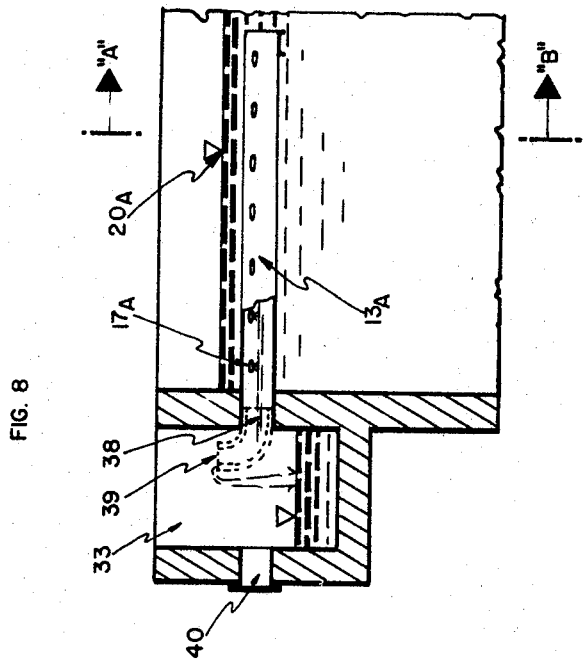

United States Patent Office 3,437,212
Patented Apr. 8, 1969

3,437,212
APPARATUS FOR SCUM REMOVAL
Ewald Reinhard Thorn, Ruckershausen, Wilhelm Weber, Diez (Lahn), Ernst Siegfried Lemberg, Michelbach, Nassau, and Josef Blanche, Zollhaus, Nassau, Germany, assignors to Passavant-Werke, Michelbach, Nassau, Germany, a corporation of Germany
Filed Sept. 19, 1967, Ser. No. 668,884
Int. Cl. B01d 43/00
U.S. Cl. 210—525                                14 Claims

ABSTRACT OF THE DISCLOSURE

Apparatus for removing scum from clarified liquid in a clarification tank by providing a plurality of horizontal open topped, radially extending box conduits near the surface with openings below the surface into which clarified liquid can enter. The outer ends of the conduits extend out of the tank for discharge of the clarified effluent. For scum removal, the liquid level is raised by plugging the outer ends of the conduits while rotating blades mounted at the scum line collect scum for discharge through a weir-like collection trough which has a separate discharge outlet to separate scum from clarified effluent.

*Background of the invention*

This invention relates to the field of waste water treatment, and, more particularly to apparatus for removing scum and other floating debris from the surface of clarified liquid in a circular clarification or settling tank.

Prior apparatus to perform this function usually operate by either attempting to travel through the upper surface of the liquid and skim the scum up, or to push the scum accumulations into a series of elongated scum troughs arranged around the inner periphery of the tank.

In circular clarifiers, the scum pushing, or collecting, is done with a blade which dips into the liquid to direct scum to the scum troughs. The collection blade is supported on a rotating truss or bridge. Clarified effluent is discharged under a baffle which extends into the liquid to prevent scum from accompanying the clarified effluent.

Sometimes, when a rotating collection blade is not used, a slotted box or pipe is extended across the radius or diameter of the tank. It then can be raised out of the liquid when scum collection is not desired or lowered into the liquid to collect scum. A variation of this method is to rotate the whole slotted pipe through the liquid, about a vertical axis, at or near the surface.

All of these methods and apparatus have been found to be deficient in one or more aspects. The liquid level sometimes varies due to a sudden decrease in the supply or a surge from the pumping means. In apparatus utilizing a baffle extending down into the discharged effluent, a sudden drop in liquid level could result in scum evading the baffle and being discharged with the clarified effluent.

In apparatus utilizing a collecting, or skimming blade in cooperation with scum troughs, the possibility exists that higher liquid levels will cause excessive discharge of clarified effluent together with the scum into the scum troughs. In both of these situations, the efficiency is decreased by either repolluting the clarified effluent or discharging an excessive quantity of clarified liquid into the scum trough.

In the case of slotted rotating, or non-rotating, pipes, a rigid structure must be provided to support the pipe and assure that it is exactly level and that no excessive stresses are allowed to build up. Such supporting structure is costly. If the slotted pipe does not rotate or move, rotating collector blades are usually provided to move the scum to the pipe. These blades must then either pass over the pipe, or some mechanism must be provided to raise and lower the pipe in synchronization with the collector blade movement. Again, such extra apparatus is costly to build and maintain.

*Summary of the invention*

This invention obviates the problems associated with prior scum removal apparatus. Fluctuations in the liquid level in the tank will not cause scum to mix in with clarified effluent, nor will it cause undue quantities of clarified liquid to be collected with the scum. Also, due to a unique mounting and operating arrangement, there is no problem concerning the deflection of the clarified liquid discharge chutes. Scum can be collected for discharge either periodically or continuously while clarified liquid can be discharged simultaneously.

The liquid level within the tank, which is usually designated as a clarification or settling tank, is maintained at a specified "normal" liquid level by controlling the rate of incoming flow. A plurality of discharge chutes are mounted radially and horizontally from the center of the circular tank with their outer ends extending through the tank wall. The discharge chutes extend above and below the normal liquid line, and influent openings are located along a horizontal line in them below the normal liquid level line.

This allows clarified liquid to enter the discharge chutes for discharge out of the tank while denying the same access to the scum because the scum floats higher than the influent openings.

When it is desired to remove the scum, the discharge effluent is dammed by either placing a gate in the outer end of each discharge trough or damming the annular collection trough which surrounds the tank wall on its outer periphery near the top. This causes the liquid to rise to a higher "scum" level.

Normally, clarification tanks are equipped with one or more sets of scrapers which extend radially outward from the center of the tank, on the bottom, to gather settled deposits and direct them to a central sump for discharge. These scrapers are mounted on a truss or bridge which is supported by, and rotates about, a central pylon within the tank. A motor or other suitable driving means is provided to rotate the bridge.

In this invention, a collection blade is mounted on the bridge and extends downward, horizontally to the scum liquid level. Rotation of the sludge scraper blades by the bridge also causes the collection blade to rotate to gather and guide the scum outwardly to the periphery of the tank.

On the inner periphery of the tank, at the scum liquid level, are located one or more scum collectors. These scum collectors have one wall against the inner periphery of the tank wall with the other walls extending well above the scum liquid level. The forward wall, in the direction of bridge rotation, is pivoted horizontally about its lower edge and resiliently urged to remain in an upright position.

A scum blade is pivotally mounted on the bridge horizontally and directly above the forward wall of the scum collector also at the scum liquid level. As the bridge rotates, the collector blade gathers scum and directs it to the region near the tank wall. As the bridge approaches and passes the scum collector, it actuates a lever arrangement which deflects the forward wall of the scum collector and the scum blade sweeps scum over the downturned wall which then acts as a wier for a brief time. When the bridge has passed, the wall returns to its upright position and access of scum and liquid to discharge from the tank is terminated.

It can be appreciated that the collection blade concentrates the scum accumulations before the scum collector prior to its being guided in by the scum blade. In this manner, the scum concentration is maximized and loss of clarified effluent is kept to a minimum.

When the scum as been removed, the discharge chutes are undammed and the liquid returns to the normal level. A variation in the apparatus, described later, allows continuous operation at the scum liquid level with simultaneous discharge of clarified liquid.

An object of this invention is to provide apparatus which efficiently and simultaneously removes scum and discharges clarified effluent from liquid being treated.

Another object is to provide apparatus which operates efficiently and is not adversely affected by unscheduled changes in the liquid level within the tank.

Still another object is to provide apparatus wherein the clarified discharge is uniform around the tank.

The invention will be more readily understood by reference to the drawings, which form a part thereof.

Brief description of the drawings

FIGURE 2 is an enlarged view of the discharge trough, bridge, and scum blade and collector.

FIGURE 3 is a partial top view of the tank showing the scum collector and the discharge chute arrangement.

FIGURE 4 is an enlarged side view of the scum collector taken along section A—A of FIGURE 3.

FIGURE 5 is a split top view of the tank showing discharge at scum level on the left and at normal level on the right.

FIGURE 6 is an elevational section view of the collection trough showing the partition wall and the slots in the tank wall along section A in FIGURE 5.

FIGURE 7 shows a section along B in FIGURE 5.

FIGURE 8 is a partial sectional elevational view of the discharge chute and collection trough.

FIGURE 9 is a cross section view along the lines A–B of FIGURE 8.

FIGURE 10 shows another variation in which the liquid level can be continuously dammed.

Description of the preferred embodiments

Figure 1:
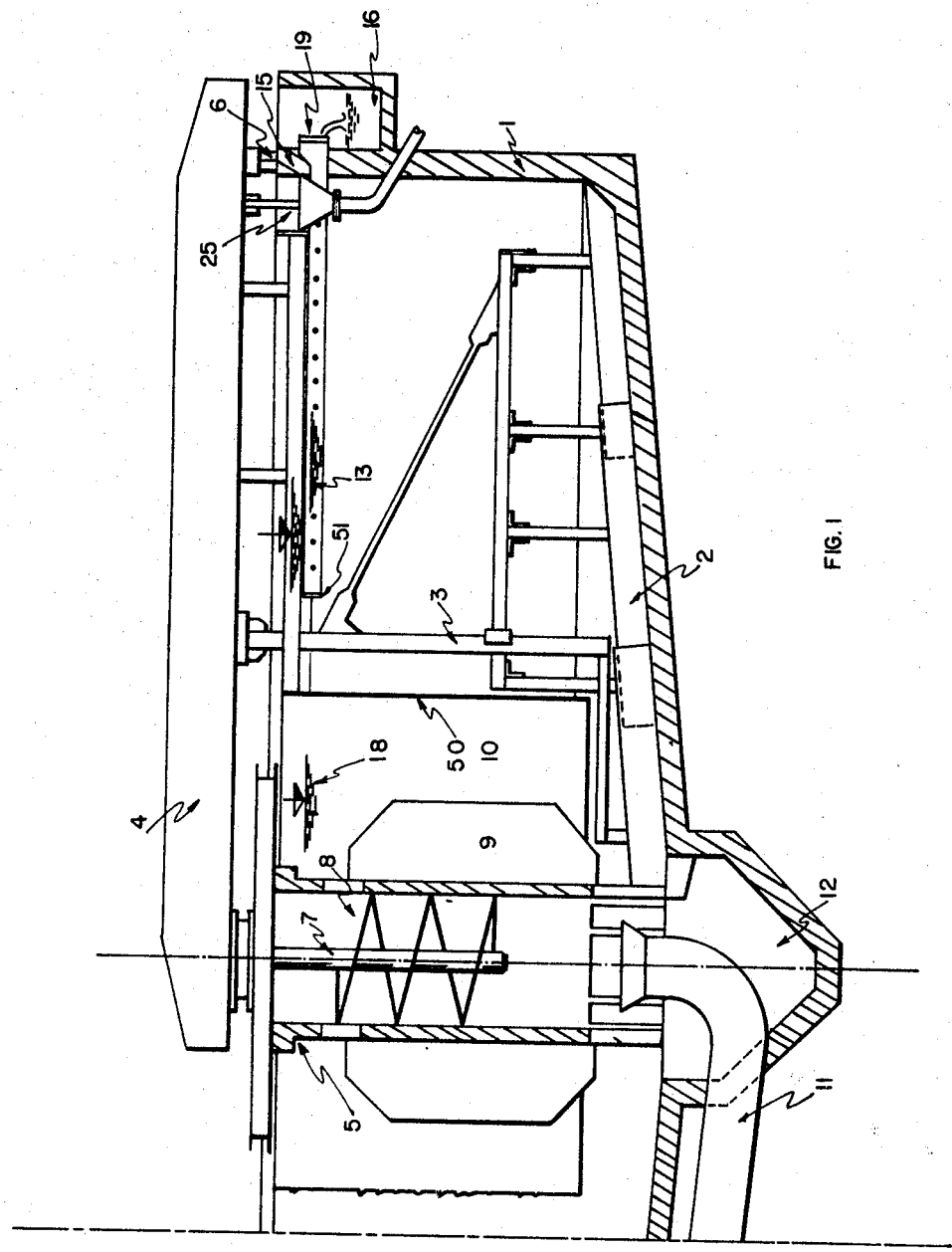
FIGURE 1 is a side elevational view, in section, showing the clarification tank, bridge, sludge scraper blades and the discharge troughs.

As shown in FIGURE 1, a clarification tank 1 is provided with a collection trough 16 annularly attached about its outer periphery. Within tank 1, an inlet tower 5 is positioned in the center into which the waste water inlet 11 discharges raw sewage influent. A shaft 7 mounts auger 8 positioned within tower 5 to convey and mix incoming liquid. Inner and outer flocculation, or reaction chambers 9, 10, respectively, surround inlet tower 5 concentrically. A cylindrical wall 50 surrounds the reaction zone and separates it from the sedimentation zone which surrounds it.

A bridge 4 is rotatably mounted about the top of inlet tower 5. The outer end of bridge 4 is supported on wall 15 with wheels 6 for rotation thereabout. Supporting arms 3 connect sludge scraper blades 2 with bridge 4. As the bridge rotates, settled accumulations are urged by scraper blades 2 into sump 12 for discharge.

A plurality of equally spaced discharge chutes 13 are horizontally arranged radially near the top of tank 1. A plurality of influent openings 17 are located horizontally on both sides of each discharge chute 13. These influent openings 17 allow clarified liquid to enter to be discharged into collection trough 16 via normally open gate plug 19 at the outer end of each chute.

In the embodiment shown in FIGURES 1, 2, 3 and 4, discharge chutes 13, 14 are U-shaped with the top open. Normally, the liquid level 18 is above the influent openings 17, but below the top of each chute. Clarified liquid (influent) can enter through openings 17, but scum, being at a higher level, cannot. Gate plugs 19 are normally open, but they can be lowered, when scum removal is required, to raise the liquid level. Under steady operating conditions, the amount of liquid entering through inlet 11 equals the influent entering chutes 13 and the liquid remains at "normal" operating level 18.

The inner ends of discharge chutes 13 are attached to a circular ring 51 which allows the chutes to span the diameter of the tank and be supported at both inner and outer ends while not traversing the inner core. Interference with the sludge scraper blade support arm 3 is thereby avoided. The outer end of each discharge chute is mounted in, and extends through, tank wall 15.

When scum removal is desired, individual gate plugs 19 are lowered and the liquid begins to dam up to a higher "scum" level 20. At scum level 20, the scum comes within range of collector blade 22 mounted horizontally on, and extending downwardly from, bridge 4. Both collector blade 22 and scum level 20 are above the tops of discharge chutes 13, 14 so interference during rotation is avoided.

As bridge 4 rotates, collector blade 22 gathers scum and directs it to the edge of circular tank 1. Between discharge chutes 13, 14 at one or more locations, a scum collector 25 is mounted on the inner tank wall at the scum level 20. Scum collector 25 consists of a four-walled open topped receptacle with a sloped, or conical floor in which an outlet leading out of the tank is located. The forward, or leading, wall 24 in the direction of bridge travel, is pivoted horizontally about its lower edge. This lower edge is at, or slightly below, scum liquid level 20 so as to aid ingestion of scum into collector 25 whose other three walls all extend well above scum level 20.

Mounted on bridge 4, directly above leading wall 24, is a scum blade 23 which is pivotally mounted horizontally with arms 29 and is prevented from extending below liquid level 20 by chain 31. As bridge 14 rotates, scum blade collects the scum directed to the tank edge by collector blade 22 and forces it up and into collector 25. A rail 26 is mounted to the bottom of bridge 4. An arm 52 is attached to the leading wall 24 and extends upwardly and ends with a roller 27. Its other end is weighed down with counterweight 28. When the bridge passes, roller 27 contacts rail 26 to lower wall 24 and allow scum to enter collector 25. An inclined ramp 32 aids scum blade 23 in riding over wall 24.

When scum is being gathered and discharged, the liquid level is above the tops of chutes 13, 14 but no scum is discharged into the collection trough 16 because it is blocked by the top edge 21 of gate 19. Clarified liquid can still discharge, below scum level 20, beneath gate 19.

As shown in FIGURES 5, 6 and 7, an alternate method of damming the liquid can be used which does not necessitate damming each discharge chute 13 with a gate 19. Instead, an annular partition 34, concentric with the outer wall of tank 1, is mounted in collection trough 33. Partition 34 extends upwardly at least as high as scum liquid level 20. The outer ends of discharge troughs 13 are always open. When scum removal is desired, gate 36 is lowered (closed) and fluid communication between the inner partition 33a and outer partition 33b of collecting trough 33 is cut off. The liquid rises to scum level 20 for the scum removal operation. When the liquid is at level 20, it can also spill over the top of partition wall 34 into partition 33b where it is discharged via outlet 35. Since all the liquid enters trough 33 via chute 13, below scum level 20, it is clarified effluent.

To ensure uniform discharge about the circumference of tank 1, and to alleviate clogging of chutes 13, a plurality of equally spaced slots 37 are located through wall 15. The opening of slot 37 on the inside of wall 15 is at normal liquid level 18 while the opening on the outside of wall 15 is at the scum level. This allows discharge of clarified effluent through slots 37 only at scum level 20.

If partition wall 34 is used, slots 37 may be omitted if desired. On the other hand, if slots 37 are present, partition wall 34 can be omitted. In either case, wall 34 or slots 37 perform the job of uniformly distributing the effluent out around the circumference of tank 1.

Other embodiments are shown in FIGURES 8, 9 and 10. The embodiment in FIGURES 8 and 9 are specially designed for continuous operation. In FIGURE 8, the outer end of each discharge chute 13a terminates in an upturned standpipe 39 which extends to the scum liquid level 20a to maintain liquid at that level. Discharge chutes 13a are totally enclosed, such as the pipe shown in FIGURE 9. No gates are required to dam the liquid, and continuous scum gathering is possible because the liquid remains at level 20a. Clarified influent enters the discharge chutes 13a below the surface, thereby avoiding contact with the scum.

If desired, the upturned standpipe 39 can be replaced with a standpipe 41 which is mounted in, and extends through, collection trough 16 via outlet 43. There is no direct connection with the outlets 38 of discharge chutes 13a. The top 42 of standpipe 41 is vertically adjustable so as to define the scum liquid level 20a, if desired. An access hole 40 is provided opposite each discharge chute 13a for cleaning.

In this arrangement, shown in FIGURE 10, either continuous or alternate damming is possible, depending on the height of adjustable top 42. If the alternate damming arrangement is desired, discharge chutes 13a may be open topped channels and slots 37 may be used. The adjustable standpipes 41, 42 then perform the same function of damming and discharge as partition wall 34 and gate 36 and uniform circumferential discharge of clarified effluent is assured.

Damming can also be acomplished using enclosed discharge chutes 13a with precision drilled holes in the top half to prevent clogging by rising scum. The total area of the influent openings 17a is designed to maintain the liquid continuously at scum level 20a based on the liquid being introduced into the tank through inlet 11. Standpipes 41 then serve in a discharge capacity.

Thus it will be seen that improved scum removal apparatus has been provided which achieves the objectives and advantages set forth and overcomes the disadvantages associated with prior scum removal apparatus.

The drawings and specification present a detailed disclosure of the preferred embodiments, but it is to be understood the invention is not so limited, but covers all alternate constructions, modifications and changes falling within the scope of the principles taught.

We claim:
1. In a liquid treatment tank for clarifying liquid being fed thereto, having an upstanding cylindrical wall with upper and lower ends and an annular horizontal effluent collection trough, having an outlet means therein, attached about the outer periphery thereof, rotary bridge means above the upper wall end, and drive means for rotating the bridge means, apparatus for removing the scum comprising:
a plurality of equally spaced discharge chutes, each having a top portion and an enclosed bottom, radially extending horizontally in the tank near the upper end of the walls, each said discharge chute having a closed inner end and an outer end which extends through the wall into the collection trough, and a horizontal line of influent openings in the lower portion of each discharge chute through which clarified influent enters to maintain a normal liquid level above the openings and below the upper portion of the discharge chute;
collector blade means mounted to the bridge means horizontally and extending downwardly to a scum liquid level above the normal liquid level;
a scum collector means within the tank wall at the scum liquid level to receive the scum from the collector blade means;
gate means adjustably mounted on the outer end of each discharge chute which, when closed, dams the liquid up to the scum level whereupon the collector blade sweeps the scum toward and into the scum collector.

2. Apparatus as set forth in claim 1, wherein:
said scum collector means is mounted to the inner periphery of the tank wall and comprises an enclosed receptacle having a horizontally pivoted upstanding front wall at the scum liquid level with a counterweighted arm attached thereto extending upwardly, and a scum blade is pivotally mounted on the bridge means directly over the scum collector to sweep scum received from the collector blade means into the scum receptacle through the pivoted front wall which is opened each revolution of the bridge means by the interception and depression of the counterweighted arm by the bridge means.

3. Apparatus as set forth in claim 1, further including:
a plurality of equally spaced slots in the tank wall extending upwardly from the inside at the normal liquid level to the outside at the scum liquid level, thereby allowing discharge through the slots to the collection trough only at the scum liquid level to alleviate clogging of the discharge chutes.

4. Apparatus as set forth in claim 1, wherein:
a plurality of equally spaced standpipes comprise the outlet means in the collection trough and are positioned vertically in the collection trough through the bottom thereof, each said standpipe having a vertically adjustable top so as to limit the dammed scum liquid level to a predetermined height.

5. Apparatus as set forth in claim 1, wherein:
said discharge chutes are totally enclosed within the tank, except for the influent openings, and the outer end of each discharge chute is open and elevated to the scum liquid level so the liquid is maintained at the scum level and scum can be continuously intercepted and removed by the collector blade and scum collector while clarified effluent is simultaneously being discharged.

6. Apparatus as set forth in claim 5, wherein:
said discharge chutes have a substantially circular cross section and the influent openings are accurately dimensioned to maintain a constant discharge to the collection trough, and constant scum liquid level based on the rate of liquid entering the tank.

7. Apparatus as set forth in claim 6, wherein:
the influent openings are positioned in the upper portion of the discharge chutes.

8. In a liquid treatment tank for clarifying liquid being fed thereto, having an upstanding cylindrical wall with upper and lower ends and an annular horizontal collection trough, having an outlet means therein, attached about the outer periphery thereof, rotary bridge means above the upper wall end, and drive means for rotating the bridge means, apparatus for removing scum from clarified effluent comprising:
a plurality of equally spaced discharge chutes, each having a top portion and an enclosed bottom, radially extending horizontally in the tank near the upper end of the walls, each said discharge chute having a closed inner end and an open outer end which extends through the wall into the collection trough, and a horizontal line of influent openings in the lower portion of each discharge chute through which clarified influent enters to maintain a normal liquid level above the openings and below the upper portion of the discharge chute;
collector blade means mounted to the bridge means horizontally and extending downwardly to a scum liquid level above the normal liquid level;
a scum collector means within the tank wall at the scum liquid level to receive the scum from the collector blade means;

an annular upstanding partition wall within and concentric with the collection trough to form inner and outer portions thereof, said partition wall extending upwardly to the scum liquid level to intercept the effluent and direct it into the inner portion;

an adjustable partition gate means mounted in the partition wall to allow fluid communication between inner and outer portions so that when the partition gate means is closed, the liquid is dammed up to the scum level whereupon the scum can be removed by the scum collector means.

9. Apparatus as set forth in claim 8, wherein:

said scum collector means is mounted to the inner periphery of the tank wall and comprises an enclosed receptacle having a horizontally pivoted upstanding front wall at the scum liquid level with a counterweighted arm attached thereto extending upwardly, and a scum blade is pivotally mounted on the bridge means directly over the scum collector to sweep scum received from the collector blade means into the scum receptacle through the pivoted front wall which is opened each revolution of the bridge means by the interception and depression of the counterweighted arm by the bridge means.

10. Apparatus as set forth in claim 8, further including:

a plurality of equally spaced slots in the tank wall extending upwardly from the inside at the normal liquid level to the outside at the scum liquid level, thereby allowing discharge only at the scum liquid level to allow continuous scum removal and simultaneous clarified influent discharge at the scum liquid level.

11. In a liquid treatment tank for clarifying liquid being fed thereinto, having an upstanding cylindrical wall with upper and lower ends and an annular horizontal collection trough, having an outlet means therein, attached about the outer periphery thereof, rotary bridge means above the upper wall end, and drive means for rotating the bridge means, apparatus for removing scum from clarified effluent comprising:

a plurality of equally spaced discharge chutes, each having a top portion and an enclosed bottom, radially extending horizontally in the tank near the upper end of the walls, each said discharge chute having a closed inner end and an open outer end which extends through the wall into the collection trough, and a horizontal line of influent openings in the lower portion of each discharge chute through which clarified influent enters to maintain a normal liquid level above the openings and below the upper portion of the discharge chute;

collector blade means mounted to the bridge means horizontally and extending downwardly to a scum liquid level above the normal liquid level;

a scum collector means within the tank wall at the scum liquid level to receive the scum from the collector blade means;

a plurality of equally spaced slots in the tank wall extending upwardly from the inside at the normal liquid level to the outside at the scum liquid level, thereby allowing discharge through the slots to the collection trough only at the scum liquid level to alleviate clogging of the discharge chutes;

an adjustable collection gate means mounted in the collection trough to allow discharge of clarified effluent and to periodically dam the liquid to the scum level whereupon the scum can be removed by the scum collector means.

12. Apparatus as set forth in claim 11, wherein:

said scum collector means is mounted to the inner periphery of the tank wall and comprises an enclosed receptacle having a horizontally pivoted upstanding front wall at the scum liquid level with a counterweighted arm attached thereto extending upwardly, and a scum blade is pivotally mounted on the bridge means directly over the scum collector to sweep scum received from the collector blade means into the scum receptacle through the pivoted front wall which is opened each revolution of the bridge means by the interception and depression of the counterweighted arm by the bridge means.

13. Apparatus as set forth in claim 11, wherein:

said discharge chutes are totally enclosed within the tank, except for the influent openings, and the outer end of each discharge chute is open and elevated to the scum liquid level so the liquid is maintained at the scum level and scum can be continuously intercepted and removed by the collector blade and scum collector while clarified effluent is simultaneously being discharged.

14. Apparatus as set forth in claim 11, wherein:

said discharge chutes are totally enclosed within the tank, except for the influent openings which are located in the top half of each discharge chute;

said adjustable collection gate means comprises a plurality of equally spaced standpipes vertically positioned in the collection trough through the bottom thereof, each said standpipe having a vertically adjustable top so as to allow continuous scum removal operation at the scum liquid level and to limit the dammed scum liquid level to a predetermined height.

References Cited

UNITED STATES PATENTS 2,821,306   1/1958   Davila _____ 210—525

REUBEN FRIEDMAN, *Primary Examiner.*

J. L. DE CESARE, *Assistant Examiner.*

U.S. Cl. X.R.

210—537